(12) United States Patent
Ranganathan et al.

(10) Patent No.: US 10,009,504 B1
(45) Date of Patent: Jun. 26, 2018

(54) METHODS AND SYSTEMS FOR PROCESSING REFERENCES INCLUDED IN A DOCUMENT

(71) Applicant: XEROX CORPORATION, Norwalk, CT (US)

(72) Inventors: Sathyanarayanan Ranganathan, Chennai (IN); Sudharshan Pragada, Chennai (IN); Senthilmurugan Velayutham, Chennai (IN); Abhay Budakoti, RaeBareli (IN); Chanchal Teotia, Ghaziabad (IN)

(73) Assignee: XEROX CORPORATION, Norwalk, CT (US)

( * ) Notice: Subject to any disclaimer, the term of this patent is extended or adjusted under 35 U.S.C. 154(b) by 0 days. days.

(21) Appl. No.: 15/585,466

(22) Filed: May 3, 2017

(51) Int. Cl.
| | | |
|---|---|---|
| H04N 1/40 | (2006.01) | |
| H04N 1/60 | (2006.01) | |
| H04N 1/32 | (2006.01) | |
| H04N 1/00 | (2006.01) | |
| H04N 1/21 | (2006.01) | |
| H04N 1/23 | (2006.01) | |

(52) U.S. Cl.
CPC ..... *H04N 1/32352* (2013.01); *H04N 1/00408* (2013.01); *H04N 1/00485* (2013.01); *H04N 1/00968* (2013.01); *H04N 1/21* (2013.01); *H04N 1/2338* (2013.01); *H04N 1/32133* (2013.01); *H04N 2201/0082* (2013.01); *H04N 2201/0094* (2013.01); *H04N 2201/3212* (2013.01); *H04N 2201/3269* (2013.01); *H04N 2201/3271* (2013.01)

(58) Field of Classification Search
CPC ........... H04N 1/32352; H04N 1/00408; H04N 1/00485; H04N 1/00968; H04N 1/21; H04N 1/2338; H04N 1/32133; H04N 2201/0082; H04N 2201/0094; H04N 2201/3212; H04N 2201/3269
See application file for complete search history.

(56) References Cited

U.S. PATENT DOCUMENTS

2009/0316187 A1* 12/2009 Kajikawa ........... H04N 1/00233
  358/1.15
2013/0070300 A1*  3/2013 Coulter ................ G06F 3/1208
  358/1.15

* cited by examiner

*Primary Examiner* — Quang N Vo

(57) ABSTRACT

Disclosed herein are methods and systems for processing a number of references mentioned in a document. A job request including a document for processing from a user is received. The document is at least one of a hardcopy document and a digital document. A multi-function device prompts the user to select a reference processing option when the user wants at least one reference of the document to be processed. Based on the selection of the reference processing option one or more references mentioned in the document are determined. Based on the determined one or more references, a referred content information for each of the one or more reference is searched. Then the referred content information along with one or more options including at least one of a print option, a save option and a send option are presented to the user.

20 Claims, 19 Drawing Sheets

METHODS AND SYSTEMS FOR PROCESSING REFERENCES INCLUDED IN A DOCUMENT

TECHNICAL FIELD

The presently disclosed subject matter relates to the field of processing documents, and more particularly to methods and systems for processing references mentioned in a document.

BACKGROUND

Printers and scanners are widely used in offices, educational institution, homes, libraries, etc. The printer (or scanner) is configured to receive a job request including a document for printing, and so forth. Many times, the document includes one or more references. The references are usually provided in the document for providing better understanding and clarity about the content of the document. The readers of the document may use those references for retrieving more information about the content of the document.

In present scenario, the user prints the document that includes the references. And if the user needs more or useful information about any of the mentioned references, then the user may manually search for additional information based on references on the Internet using any computing device such as, a computer, a laptop, a smart phone, and so forth. If required, the user may purchase the article or a referred content corresponding to the reference, download the article (or the referred content), and may take a print out of the same for further reading. The user has to manually browse for the references in the printed document and then search for their related referred content on the Internet. This is time consuming, and may require extra effort of the user when the document includes multiple references.

Hence, in light above discussion, there arises a need for methods and systems for processing references mentioned in the document in an easy and time efficient manner.

SUMMARY

According to aspects illustrated herein, there is provided a method for processing a plurality of references included in a document. A job request including a document for processing is received from a user. The document is at least one of a hardcopy document and a digital document, wherein the document includes one or more references. The user is prompted to select a reference processing option when the user wants at least one reference of the document to be processed. Based on the selection of the reference processing option, one or more references mentioned in the document are determined. Based on the determined one or more references, a referred content information for each of the one or more references is searched. Then, the referred content information along with one or more options including at least one of a print option, a save option and a send option, are presented to the user.

According to yet another aspect, there is provided a system for processing a plurality of references mentioned in a document. The system includes a multi-function device configured to receive a job request including a document for processing from a user. The document includes at least one of: a hardcopy document and a digital document, the document comprises one or more references. The multi-function device includes a reference processor configured for: prompting the user to select a reference processing option when the user wants at least one reference of the document to be processed; determining one or more references mentioned in the document based on the selection of the reference processing option; searching for a referred content information corresponding to each of the one or more references based on the determined one or more references. The referred content information along with one or more options including at least one of a print option, a save option, and a send option are presented to the user via a user interface of the multi-function device.

According to another aspect, there is provided a computer program product embodied on a non-transitory computer readable medium having instructions for processing a plurality of references mentioned in a document. The computer program product (CPP) is configured for receiving a job request including a document for processing from a user, wherein the document includes at least one of a hardcopy document and a digital document; prompting a user to select a reference processing option when the user wants at least one reference of the document to be processed; based on the selection of the reference processing option, determining one or more references mentioned in the document; searching for a referred content information corresponding to each of the one or more references based on the determined one or more references; and presenting the referred content information along with one or more options including at least one of a print option, a save option and a send option to the user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
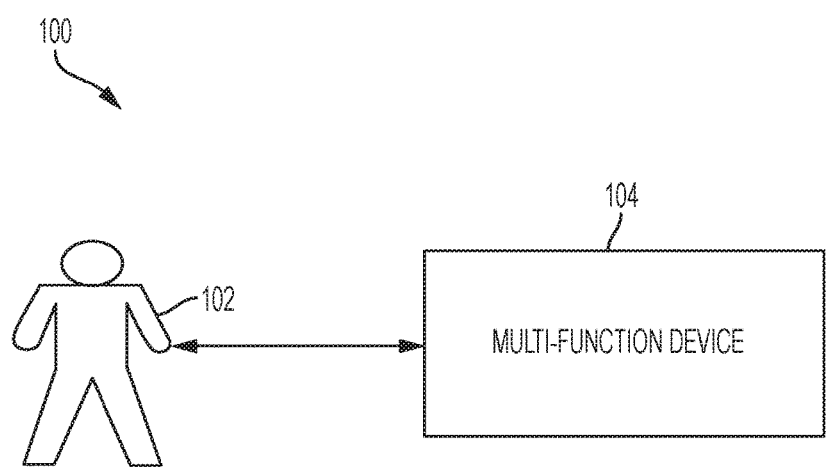
FIG. 1 is a schematic diagram illustrating an exemplary environment including a multi-function device for processing a number of references mentioned in a document, in accordance with various embodiments of the present disclosure.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below.

A term "digital document" refers to a soft copy of a document. Further, the digital document refers to electronic data that is subsequently rendered on a display so as to resemble a physical document. The digital document is a scanned image generated by scanning the physical document by using a scanning device or a multi-function device. The digital document may interchangeably be used with the phrase "electronic document" or "e-document." The digital document includes content in any known format.

The "physical document" refers to a hard copy of the document submitted by the user. The physical document includes content in any desired format.

The term "reference" is defined when a particular information or content in a document is referred at other locations in the document. The "referred content information" represents additional details or information about particular content included in the document. The reference includes a hyperlink, author name, title, publication date or the like. The references and the referred content information may be used interchangeably.

Further, as used herein, a "multi-function device" refers to a device or a combination of multiple devices that are configured to perform one or more functions such as, but not limited to, scanning, printing, cutting, imaging, and so forth. The multi-function device may include software, hardware, firmware, and combination thereof.

As used herein, a "scanner" is a device configured to scan one or more documents and create a scanned image. The scanner may or may not be a part of the multi-function device. The scanner may include software, hardware, firmware, and combination thereof.

As used herein, a "reference processor" is a device or a combination of multiple devices configured to process one or more references included in a document. The reference processor may be a part of the multi-function device or may represent an individual component or device.

The phrase a "computing device" refers to a device for communicating and exchanging data, such as, but not limited to digital documents with the multi-function device. Further, the computing device is configured to connect to a network for interacting and exchanging data with the multi-function device. Examples may include, but are not limited to, a phone, a smart phone, a tablet computer, a computer, a laptop, and any other suitable communication device.

Overview

The disclosure generally relates to systems and methods for processing a plurality of references mentioned in a document. The systems and methods may be implemented at a multi-function device, a printer, a scanner, and so forth. The disclosed systems and methods identifies one or more references mentioned in a document at the time of printing or scanning and then processes the references to identify referred content information corresponding to each of the references. The referred content information can be a link to abstract, author, and so forth. The referred content information may then be presented to the user including as a separate printed document or on the user interface of the multi-function device. This is just one example, the referred content information can be made available to the user via other ways and this will be discussed in detail below.

Exemplary Embodiments

FIG. 1 is a schematic diagram illustrating an exemplary environment 100 including a multi-function device 104 for processing a number of references mentioned in a document, in accordance with various embodiments of the present disclosure. As shown, a user 102 may access one or more functions of the multi-function device 104. The one or more functions may include, but are not limited to, scanning a document, printing a file, photocopying a document, and so forth. The document may be a softcopy or a digital document corresponding to a hardcopy document (or a physical document).

The user 102 submits a job request including a document at the multi-function device 104. In some embodiments, the user 102 submits the job request directly at the multi-function device (MFD) 104. The job request may include, but are not limited to, a print job request, a scan job request, and so forth. The document may be at least one of a hard copy document and a digital document. For example, if the job request is a print job request, the document represents a soft copy for printing. But if the job request is a scan job request, the document is a hard copy of the document. In some embodiments, the document is a pre-stored document. In some embodiments, the user 102 may submit the job request via a computing device (not shown) to the MFD 104 over a network. Examples of the computing device may include, but are not limited to, a laptop, a desktop computer, a tablet computer, a smart phone, a mobile device, and so forth. The network may be the Internet.

The MFD 104 receives the job request including the document for processing from the user 102. The MFD 104 prompts the user 102 to select a reference processing option when the user wants at least one reference to be processed in the document. In some embodiments, the MFD 104 asks the user whether he/she wants references of the document to be processed or not. The user 102 provides an input at the MFD 104. The user 102 may select the reference processing option at the MFD 104. In an exemplary scenario, the MFD 104 presents a yes option and a no option to the user 102 for asking whether the user 102 wants to check for references in the document. When the user 102 selects the yes option, the MFD 104 determines one or more references mentioned in the document. Based on the selection of the reference processing option, the MFD 104 determines the one or more references mentioned in the document.

Based on the determined one or more references, the MFD 104 searches for referred content information corresponding to each of the one or more references. Examples of the referred content information may include, but are not limited to, abstract information, a link or uniform resource locator for the references, publication details, cost of the referred content, author-information, related content, etc. In some embodiments, the MFD 104 searches for the referred content information on the Internet. Then, the MFD 104 presents the referred content information along with one or more options to the user 102. The one or more options include, but are not limited to, a print option, a save option, and a send option. Other options such as a hyperlink including a uniform resource locator (URL) to download a referred content corresponding to the one or more references may also be presented to the user 102. The referred content information may be presented via a user interface of the MFD 104. Further, the user 102 selects at least one of the print option, the save option, or the send option and the MFD 104 may receive a corresponding user instruction. In some embodiments, the MFD 104 prints the referred content information along with the document or on a last page of the document when the user 102 selects the print option. In alternative embodiments, the referred content information may be saved at the MFD 104 when the user 102 selects the save option. In some other embodiments, when the user selects the send option, the MFD 104 may send the referred content information to at least one computing device via a network.

In some embodiments, the MFD 104 may embed the referred content information about each of the one or more references as a quick response (QR) code. Further, the QR code may be embedded near or adjacent each of the one or more references.

Figure 2:
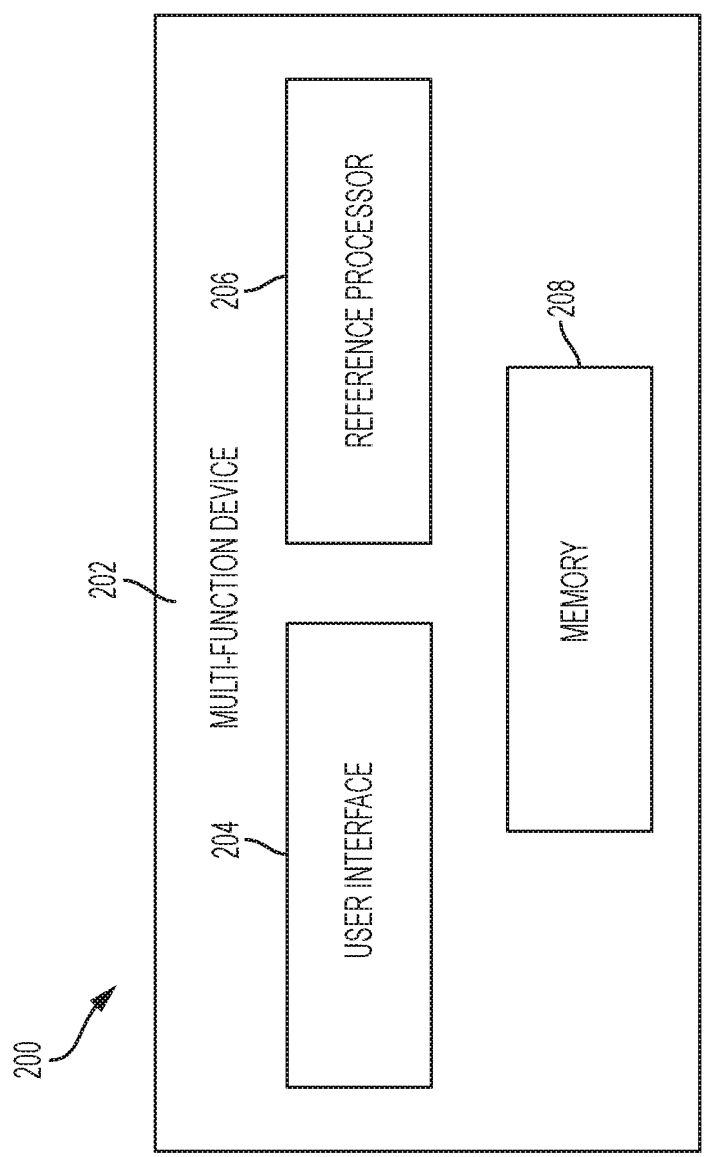
FIG. 2 is a block diagram illustrating various system elements of an exemplary multi-function device, in accordance with various embodiments of the present disclosure.

FIG. 2 is a block diagram 200 illustrating various system elements of an exemplary multi-function device 202, in accordance with various embodiments of the present disclosure. The multi-function device (MFD) 202 primarily includes a user interface 204, a reference processor 206, and a memory 208. As discussed with reference to FIG. 1, the user 102 can access the MFD 202 (or 104). The user interface 204 may allow the user 102 to interact with the MFD 202 for accessing one or more functionalities of the MFD 202. Further, the user 102 submits a job request including a document for processing via the user interface 204. The user interface 204 allows the user 102 to select at least one document for processing. The document may be a pre-stored digital document. In some embodiments, the user 102 may provide the document. For example, the user 102 may provide a hard copy document for scanning at the MFD 202. The job request may be a print job, a scan job, and so forth.

The user interface 204 may display messages for the user 102. For example, the user interface 204 may display a message prompting the user 102 to select a reference processing option when the user 102 wants at least one reference to be processed in the document. The reference processor 206 checks for the one or more references in the document based on the selection of the reference processing option by the user 102. The reference processor 206 then determines whether the document includes the one or more references based on the user input. The references may be processed one by one by the reference processor 206. Suitable technique such as optical character recognition (OCR) may be used for determining the references included in the document. Based on the determined one or more references, the reference processor 206 searches for a referred content information corresponding to each of the one or more references. Examples of the referred content information may include, but are not limited to, abstract information, publication details, cost of the referred content, author-information, related content, etc.

The user interface 204 is configured to present the referred content information along with one or more options including at least one of a print option, a save option and a send option to the user. Other options such as a hyperlink including a uniform resource locator (URL) to download a referred content corresponding to the one or more references may also be presented to the user 102. The user interface 204 is further configured to receive a selection of at least one of the print option, the save option and the send option by the user 102. The referred content information includes a purchase information for purchasing a referred content and a download information for downloading the referred content. The user 102 purchases, or downloads the referred content based on the purchase and download information.

The reference processor 206 is configured to print the referred content information along with the document or on a last page of the document when the user 102 selects the print option. In some embodiments, when a scan job is received, the reference processor 206 may generate a new digital document including the referred content information added as a last page of the document.

The reference processor 206 is configured to save the referred content information at the multi-function device 202 when the user 102 selects the save option.

The MFD 202 may also be configured to send the referred content information to at least one computing device via a network (e.g., the Internet) when the user 102 selects the send option.

The reference processor 206 may be configured to create a new document by embedding the referred content information within the document. The user 102 may retrieve the referred content based on the embedded referred content information. Further, the reference processor 206 converts the references and the referred content information into a Quick Response code. In an alternative embodiment, the reference processor 206 may generate a Quick Response code based on the referred content information only. The reference processor 206 is also configured to embed a Quick Response (QR) code corresponding to the referred content information for each of the one or more references in the new document. The user 102 may retrieve the referred content information of each of the one or more references by scanning the embedded QR code.

The referred content information of the references are saved in the memory 208 of the MFD 202. The memory 208 may further store the QR codes corresponding to the referred content information. The user 102 may download article based on the referred content information. The memory 208 may store the downloaded articles, etc. The memory 208 may be configured to store a number of digital documents for processing.

Figure 3:
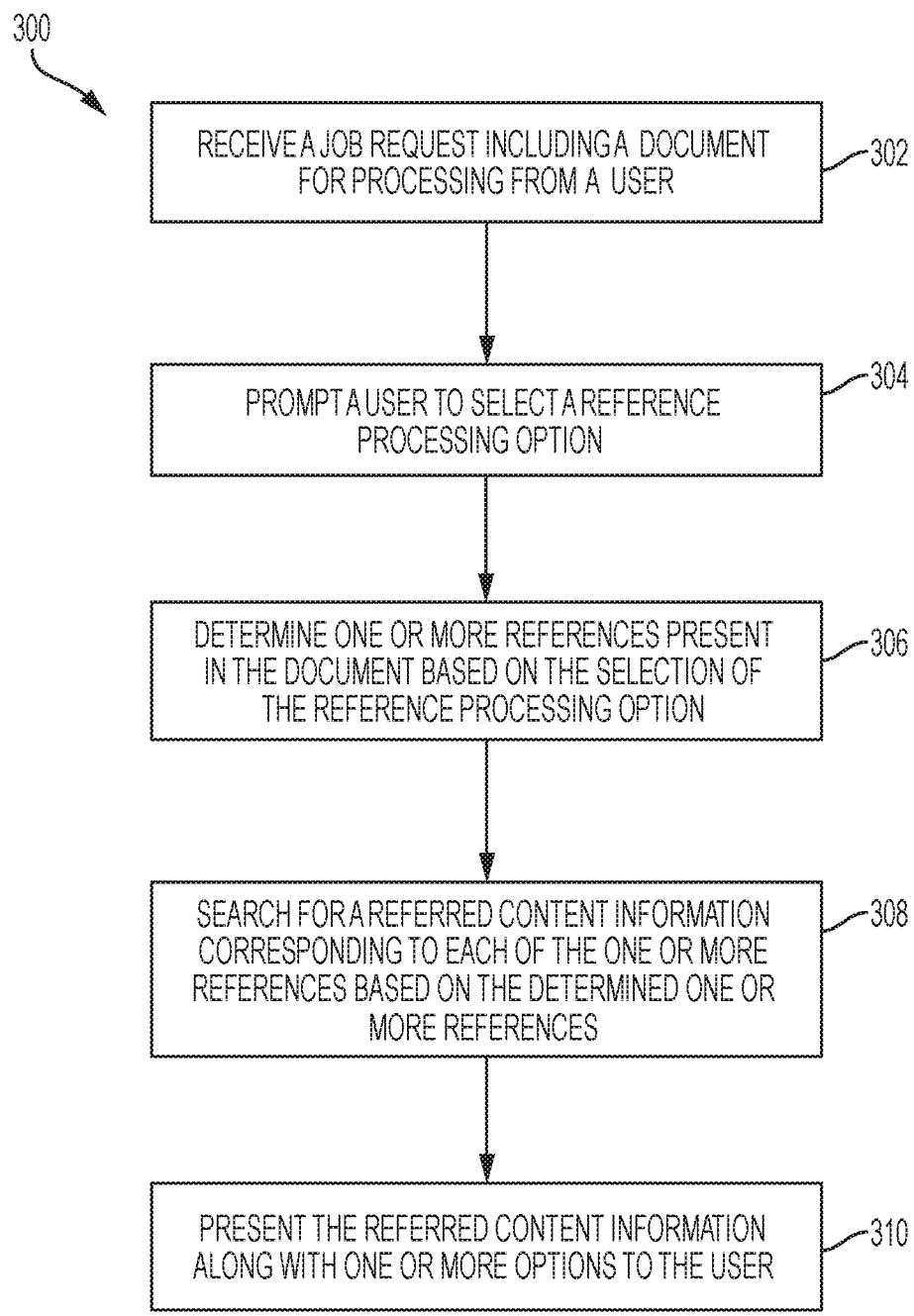
FIG. 3 is a flowchart illustrating an exemplary method for processing a number of references mentioned in a document, in accordance with an embodiment of the present disclosure.

FIG. 3 is a flowchart illustrating an exemplary method 300 for processing a number of references mentioned in a document, in accordance with an embodiment of the present disclosure. As discussed with reference to FIG. 1, the user 102 can access the multi-function device 104 (or 202).

At 302, a job request including a document is received from a user such as, the user 102. In some embodiments, the multi-function device 202 receives the request from the user 102. The user 102 may submit the job request at the MFD 202 via the user interface 204 of the MFD 202. The job request may be a print job, a scan job and so forth. For example, the user 102 may select a digital document from pre-stored digital document at the MFD 202 for printing.

Then at 304, the MFD 202 prompts the user 102 to select a reference processing option. The reference processing option may be presented or displayed on the user interface 204 to ask whether the user 102 wants at least one reference of the document to be processed. The user 102 selects the reference processing option when the user 102 wants the references to be processed. In some embodiments, the user 102 may not select the reference processing option, and the MFD 202 in such scenario may execute the job request without processing the references (if any) present in the document.

At 306, the reference processor 206 determines one or more references mentioned in the document. The references may include an author name, a book name, an article name, and so forth. The references may be determined by using suitable techniques such as, but not limited to, optical character recognition (OCR). The MFD 202 determines and processes the references one by one.

Then at 308, the reference processor 206 searches for a referred content information for each of the one or more references based on the determined one or more references. Examples of the referred content information may include, but are not limited to, abstract information, publication details, cost of the referred content, author-information, related content, etc. At 310, the referred content information for each of the one or more references along with one or more options are presented to the user 102 via the user interface 204. The one or more options include, but are not limited to, a print option, a save option, and a send option. Other options such as a hyperlink including a uniform resource locator (URL) to download a referred content corresponding to the one or more references may also be presented to the user 102. The user 102 may select at least one of the one or more options. The MFD 202 may print, save or send the referred content information based on the selection of the at least one option of the one or more options by the user 102. For example, the user 102 may select the print option for printing the document along with the referred content information. In some embodiments, the user 102 may download, and/or print a referred content corresponding to the reference by selecting the one or more options.

Figure 4A:
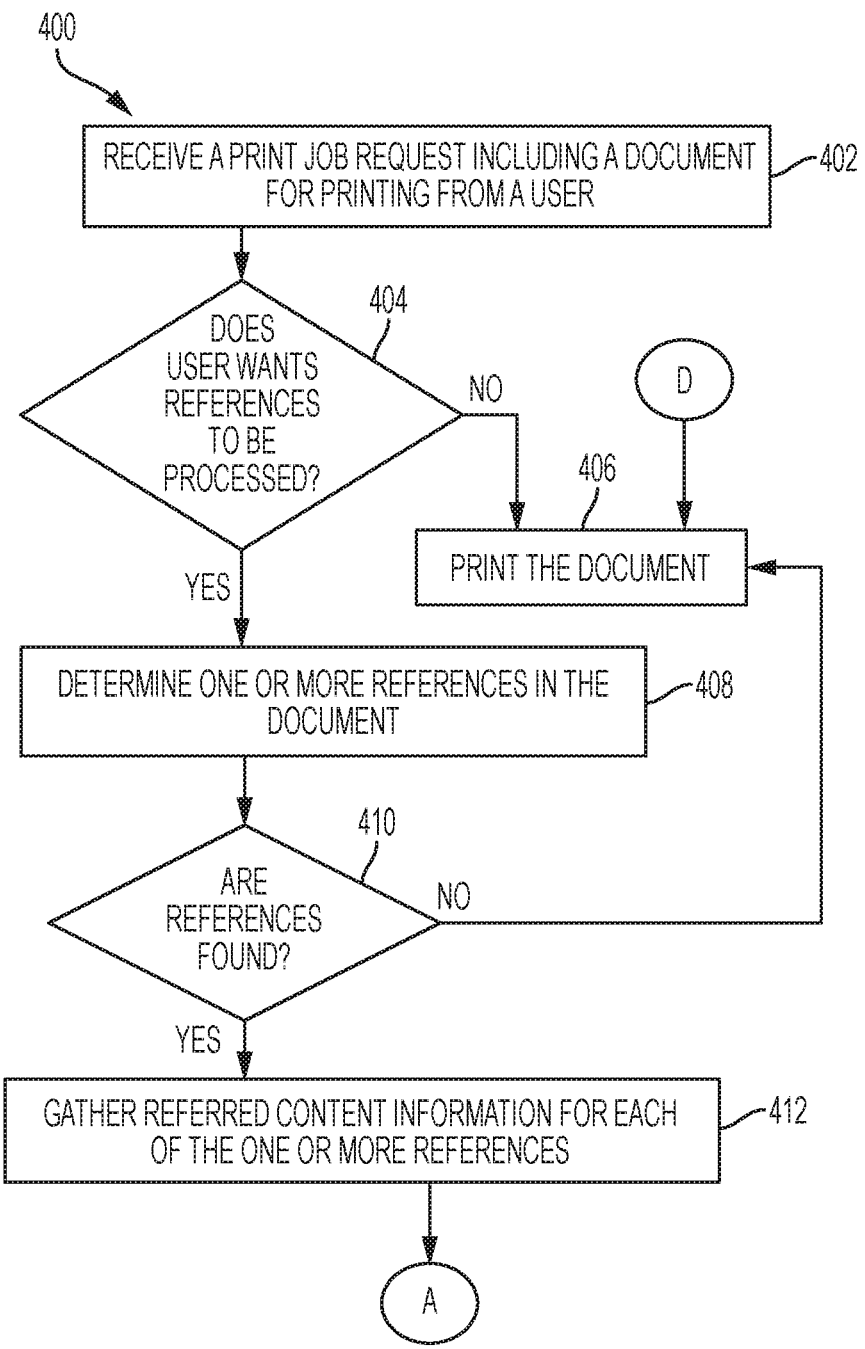
FIGS. 4A-4C represent a flowchart illustrating another exemplary method for processing a number of references mentioned in a document, in accordance with another embodiment of the present disclosure.
Figure 4B:
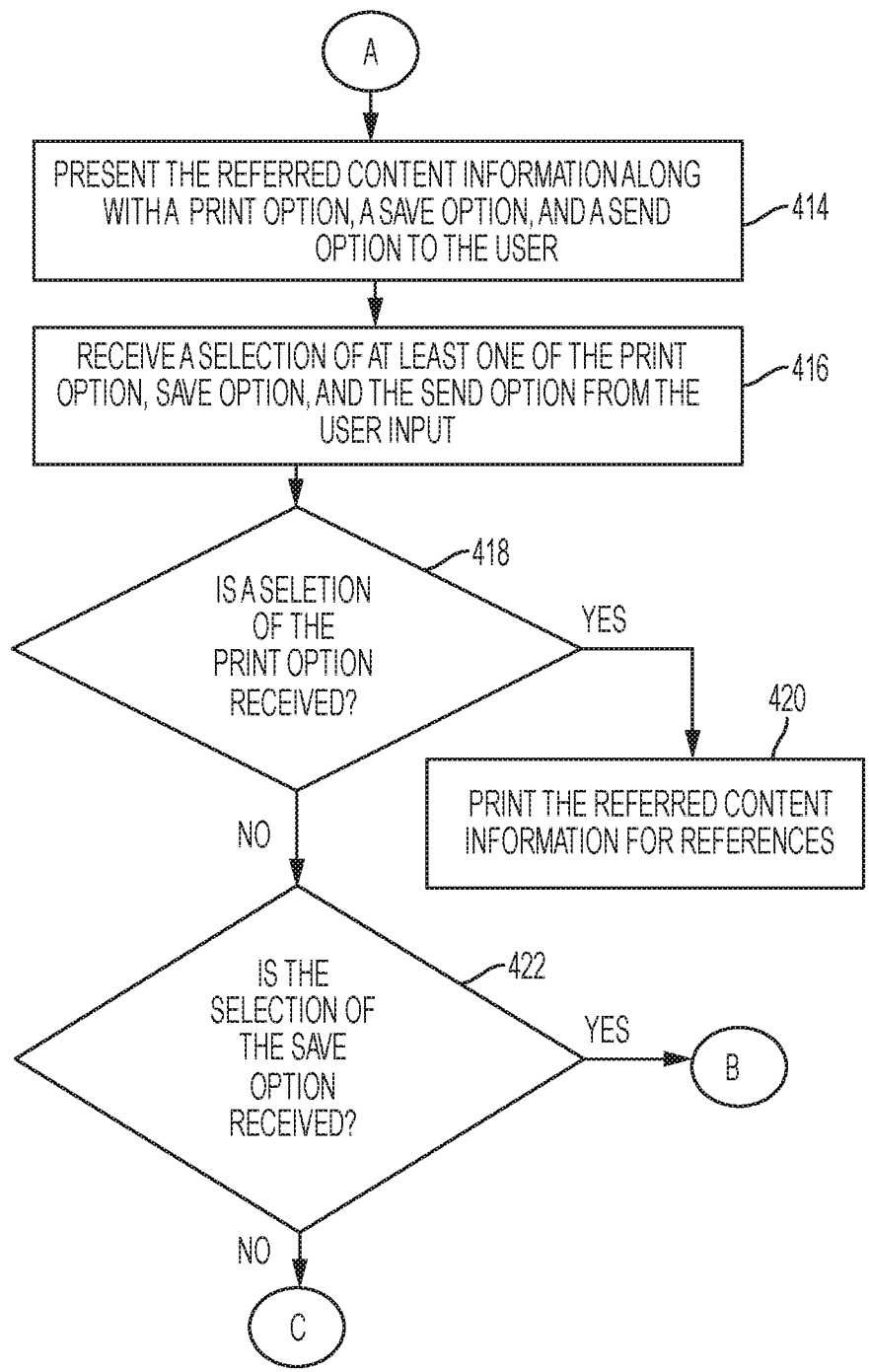
Figure 4C:
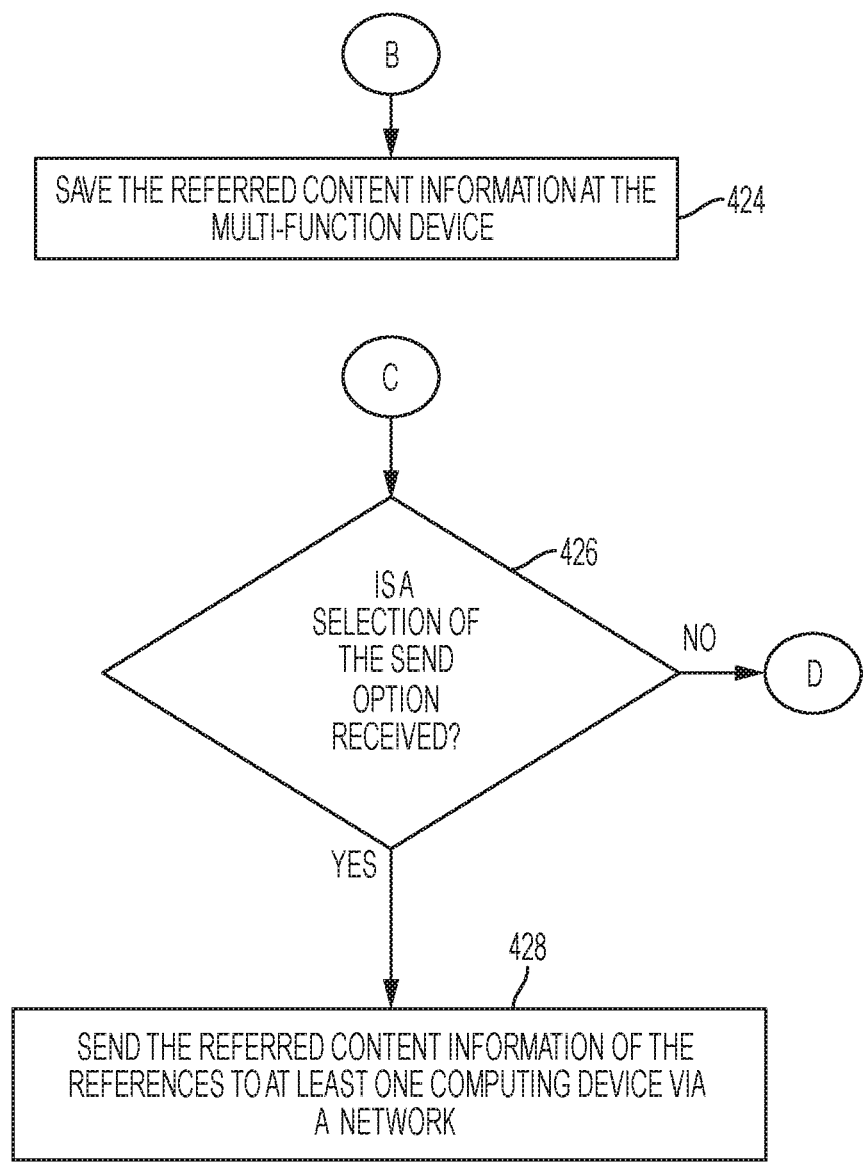

FIGS. 4A-4C represent a flowchart illustrating another exemplary method 400 for processing a number of references mentioned in a document for providing information associated with the references to a user, in accordance with another embodiment of the present disclosure.

At 402, a print job request including a document for printing is received at the MFD 202. The user 102 submits the document for printing at the MFD 202 via the user interface 204. In some embodiments, the user submits the print job request via an associated computing device. Then at 404, the MFD 202 checks whether the user 102 wants the references mentioned in the document to be processed. The user 102 may select a reference processing option when the user 102 wants the reference processing to be performed for the document. If no at 404, then block 406 is executed, else 408 is executed. At 406, the document is printed without any reference checking and processing.

At 408, the reference processor 206 determines one or more references mentioned in the document. At 410, the reference processor 206 checks whether any reference(s) found in the document. If yes then 412 is executed else 406 is executed. At 412, referred content information for each of the determined references is gathered by the reference processor 206. The references may be processed one by one by the reference processor 206. Examples of the referred content information may include, but are not limited to, abstract information, publication details, URL, cost of the referred content, author-information, related content, etc.

Then at 414, the referred content information along with one or more options, such as a print option, a save option, and a send option, are presented to the user 102 via the user interface 204 of the MFD 202. Other options such as a hyperlink including a uniform resource locator (URL) to download a referred content corresponding to the one or more references may also be presented to the user 102. The user 102 may select at least one of the one or more options displayed at the user interface 204.

At 416, a selection of at least one of the one or more options is received from the user 102. The user 102 may reach at the MFD 202 for releasing the print job by selecting at least one of the one or more options. Then at 418, the reference processor 206 checks whether a selection of the print option received. If yes then 420 is executed, else 422 is executed. At 420, the referred content information is printed. In some embodiments, the user 102 can select some of the references, and the referred content information is printed for the selected references only. In some embodiments, the referred content information for all the references mentioned in the document is printed. In alternative embodiments, the referred content information is printed as a last page of the document. In alternative embodiments, the referred content information is printed near the references in the document. Further, by selection of the print option, the referred content corresponding to the reference may get printed.

At 422, the MFD 202 checks whether a selection of the save option is received from the user 102. If yes then 424 is executed else 426 is executed. At 424, the referred content information of the references is saved at the MFD 202. The referred content information of all the references is saved in the memory 208 of the MFD 202. In some embodiment, a referred content corresponding to the reference (or referred content information) is saved based on the selection of the save option.

At 426, the MFD 202 checks whether a selection of the send option is received from the user 102. If yes then 428 is executed, else 406 is executed. At 428, the referred content information and/or a referred content corresponding to the referred content information is sent to at least one computing device, like another smart phone of another user, via a network such as, the Internet.

Figure 5A:
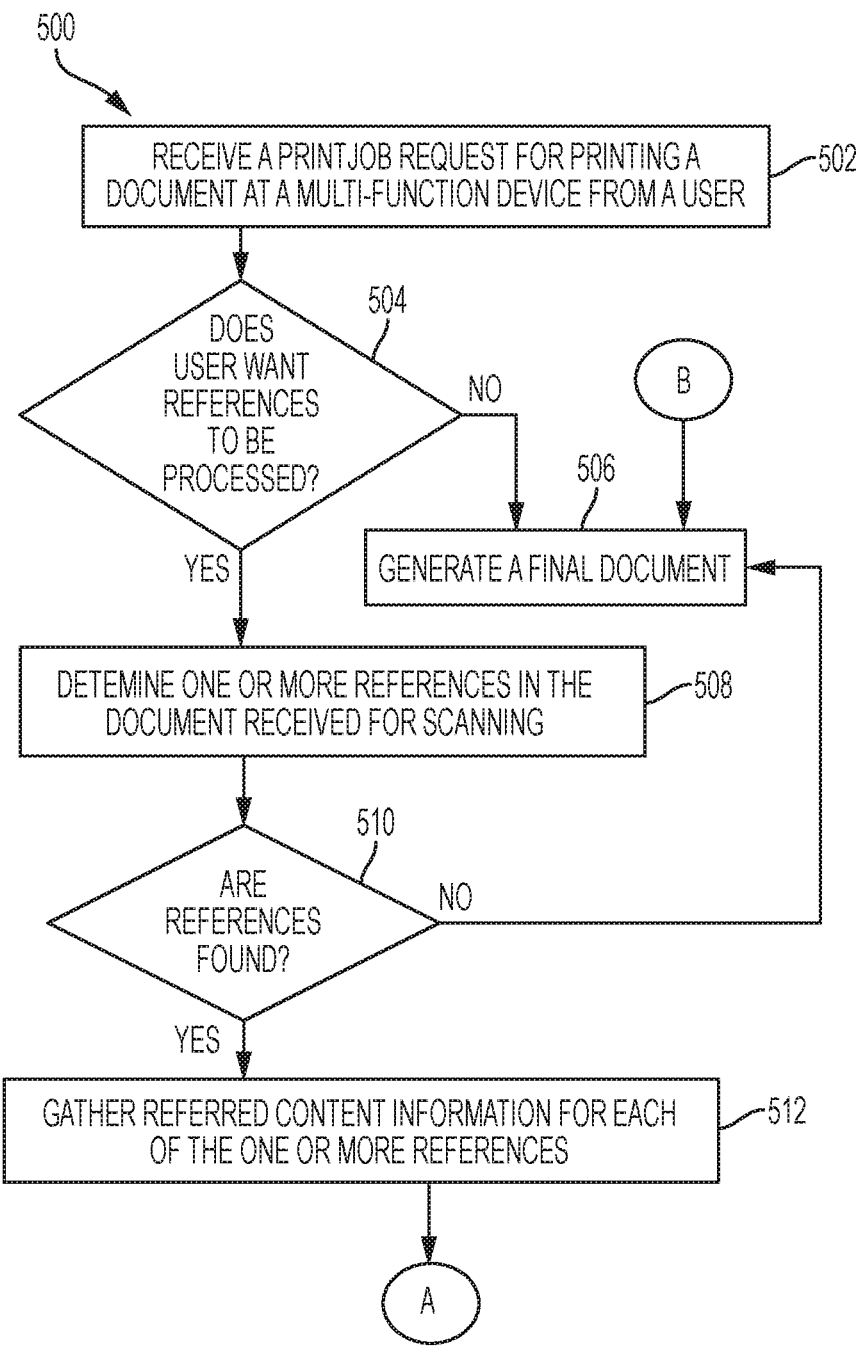
FIGS. 5A-5B represent a flowchart illustrating another exemplary method for processing a number of references mentioned in a document, in accordance with another embodiment of the present disclosure.
Figure 5B:
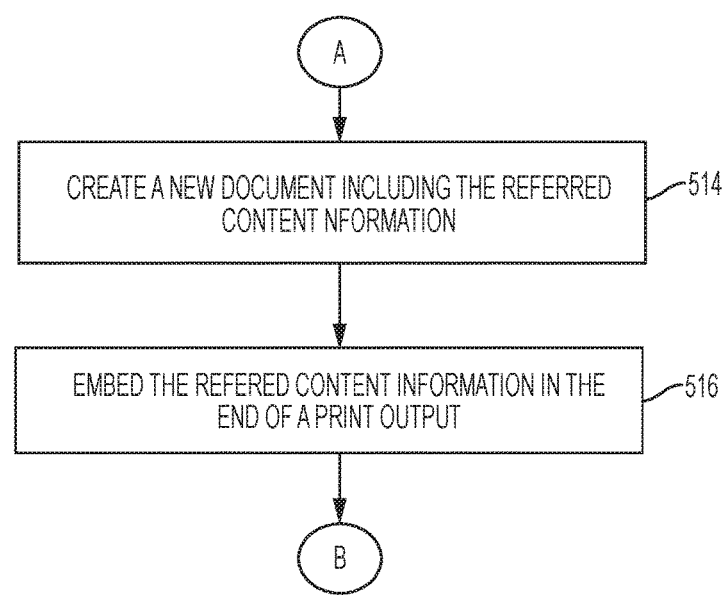

FIGS. 5A-5B represent a flowchart illustrating another exemplary method 500 for processing a number of references mentioned in a document, in accordance with another embodiment of the present disclosure. As discussed with reference to FIG. 1, the user 102 can access the MFD 104 (or 202) for submitting a job request such as, but not limited to, a print job request, a scan job request, and so forth.

At step 502, the MFD 202 receives a print job request for printing a document from the user 102. The MFD 202 may prompt the user 102 to select a reference processing option if the user 102 wants the MFD 202 to check for references in the document. The user 102 may reach at the MFD 202 for releasing the scan job by selecting at least one of the one or more options. At step 504, the MFD 202 checks whether the user 102 wants the references mentioned in the document to be processed. If yes at step 504, then a step 508 is executed; else a step 506 is executed. At step 506, a final document is generated by printing the document received in the print job request.

At step 508, the reference processor 206 determines one or more references mentioned in the document. At step 510, the reference processor 206 checks whether any reference(s) found in the document. If yes then a step 512 is executed else the step 506 is executed. The references may be processed one by one by the reference processor 206. At step 512, the reference processor 206 gathers the referred content information for each of the determined references. The reference processor 206 may gather the information about the references from the Internet. Then at step 514, a new document including the referred content information is created. At step 516, the referred content information is embedded at the end of a print output. Then, the method goes back to the step 506, where a final document including the content is printed. The final document may be the printed new document having referred content information at the end page of the document.

Figure 6A:
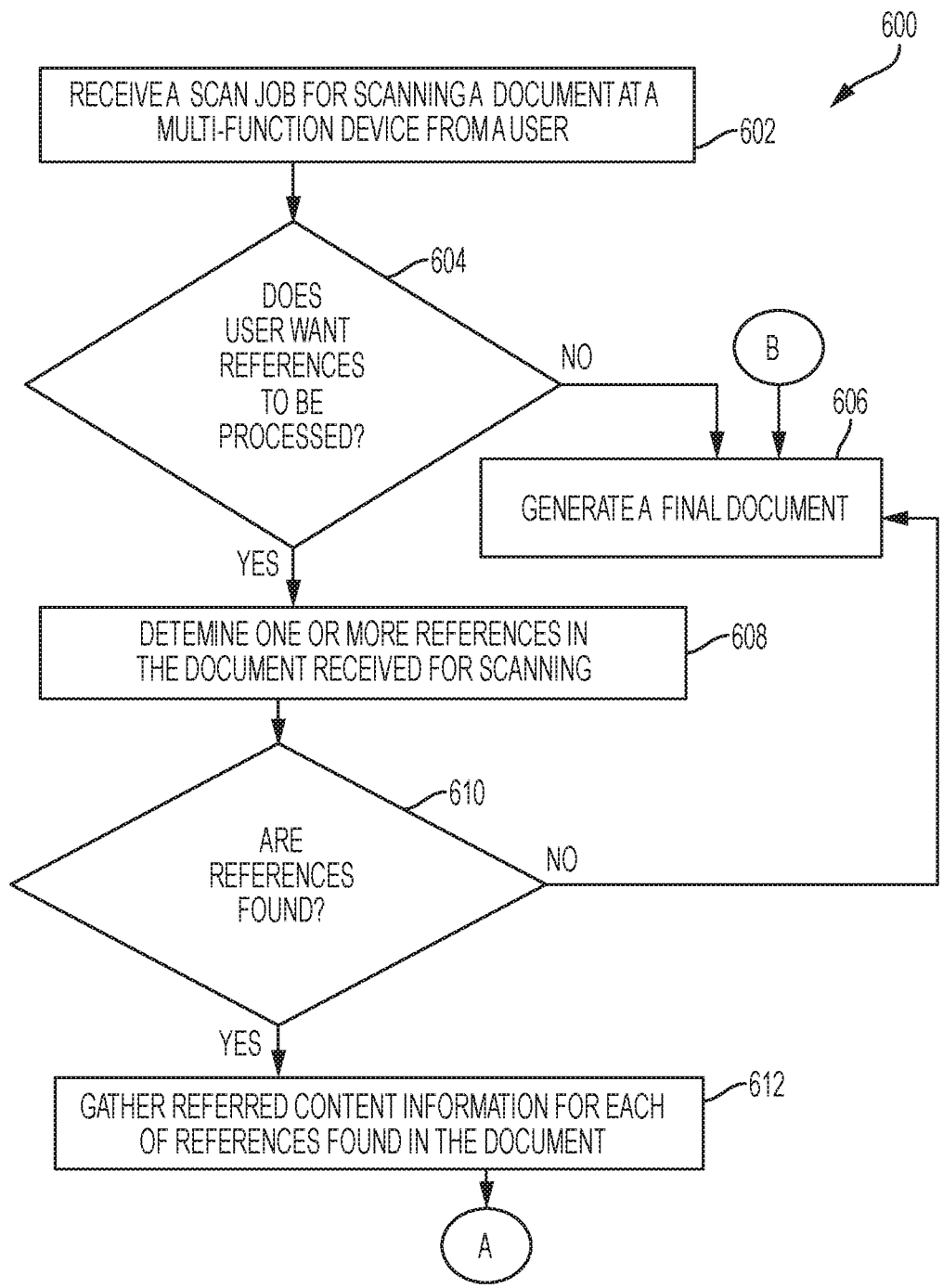
FIGS. 6A-6B represent a flowchart illustrating another exemplary method for processing a number of references mentioned in a document, in accordance with another embodiment of the present disclosure.
Figure 6B:
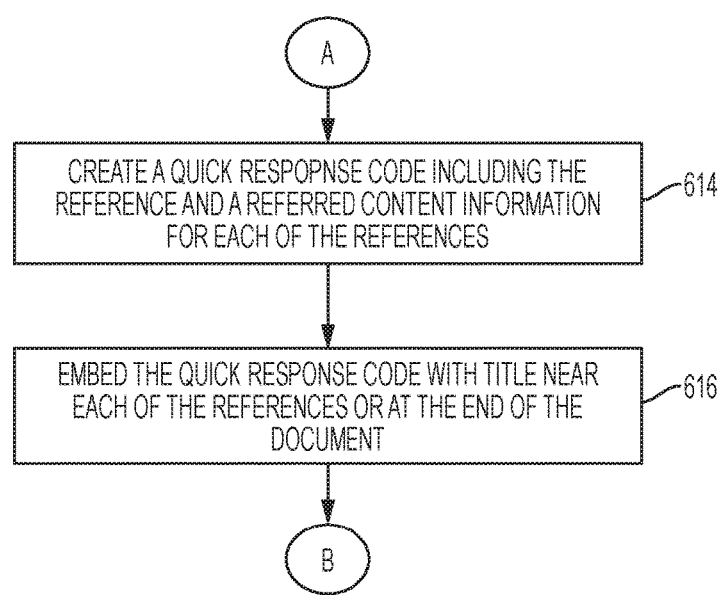

FIGS. 6A-6B represent a flowchart illustrating another exemplary method 600 for processing a plurality of references mentioned in a document, in accordance with another embodiment of the present disclosure. As discussed with reference to FIG. 1, the user 102 can access the MFD 104 (or 202) for submitting a job request such as, but not limited to, a print job request, a scan job request, and so forth.

At step 602, the MFD 202 receives a scan job request for scanning a document from the user 102. In some embodiments, a print job is received at the MFD 202. The MFD 202 may prompt the user 102 to select a reference processing option, when the user 102 wants the MFD 202 to check for references in the document. At step 604, the MFD 202 checks whether the user 102 wants the references mentioned in the document to be processed. If yes at step 604, then a step 608 is executed else a step 606 is executed. At step 606, a final document is generated by scanning the document.

At step 608, the reference processor 206 determines one or more references mentioned in the document. At step 610, the reference processor 206 checks whether any reference(s) found in the document. If yes then step 612 is executed else the step 606 is executed. At step 612, the reference processor 206 gathers the referred content information for each of the determined references. Examples of the referred content information may include, but are not limited to, abstract information, publication details, cost of the referred content, author-information, related content, etc. The user 102 may reach at the MFD for releasing the scan job (or print job). Then at step 614, the reference processor 206 creates a Quick Response (QR) code corresponding to the referred content information for each of the one or more references mentioned in the document. The QR code may include the referred content information and/or the references. At step 616, the QR code and a title for each of the one or more references are embedded near the one or more references or at the end of a document. Then control goes back to the step 606, where a final document including the QR codes and title is generated. In case of the scan job, the final document is a scanned document including the QR codes. In case of the print job, the final document is a printed document including the QR codes adjacent to the references.

Figure 7A:
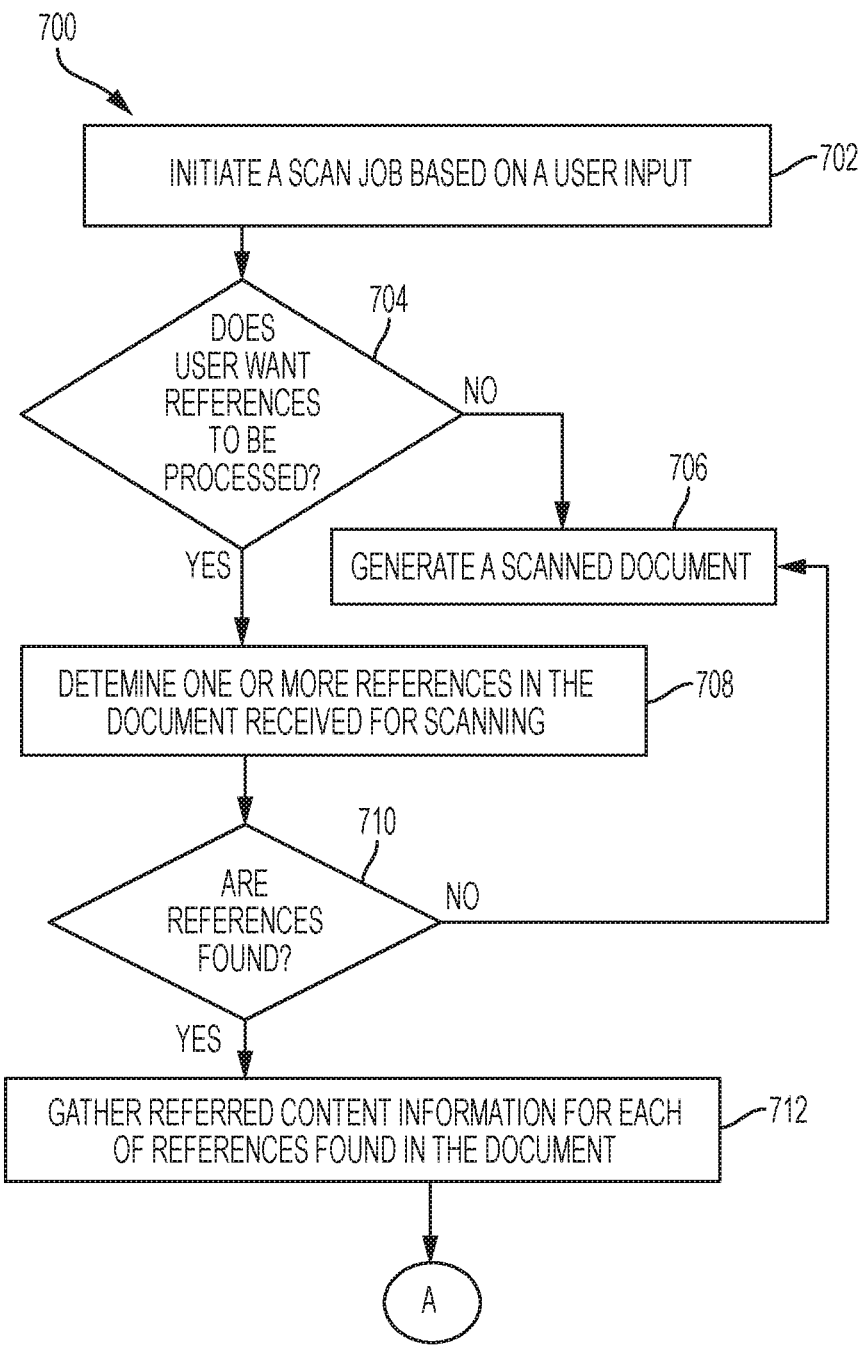
FIGS. 7A-7B represent a flowchart illustrating another exemplary method for processing a number of references mentioned in a document, in accordance with another embodiment of the present disclosure.
Figure 7B:
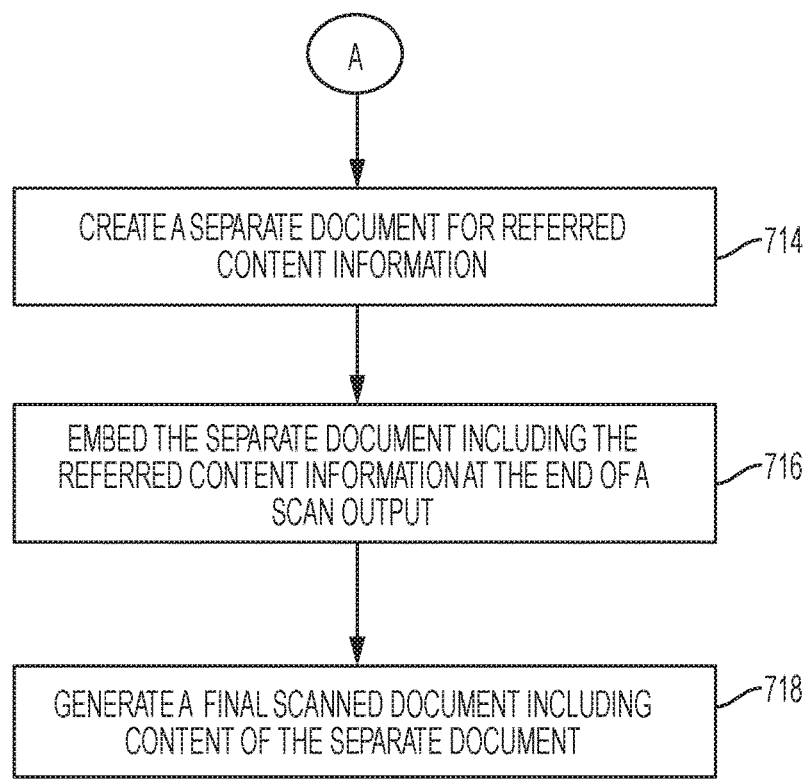

FIGS. 7A-7B represent a flowchart illustrating another exemplary method 700 for processing a plurality of references mentioned in a document, in accordance with another embodiment of the present disclosure. As discussed with reference to FIG. 1, the user 102 can access the MFD 104 (or 202) for submitting a job request such as, but not limited to, a print job request, a scan job request, and so forth.

At step 702, the MFD 202 initiates a scan job for scanning a document based on a user input. The MFD 202 may prompt the user 102 to select a reference processing option when the user 102 wants the MFD 202 to check for references in the document. At step 704, the MFD 202 checks whether the user 102 wants the references mentioned in the document to be processed. If yes at step 704, then a step 708 is executed else a step 706 is executed. At step 706, the MFD 202 generates a scanned document by scanning the document.

At step 708, the reference processor 206 determines one or more references mentioned in the document. At step 710, the reference processor 206 checks whether any reference(s) is found in the document. If yes then step 712 is executed else control goes back to the step 706. At step 712, the reference processor 206 gathers the referred content information for each of the determined references. Examples of the referred content information may include, but are not limited to, abstract information, publication details, cost of the referred content, author-information, related content, etc. The user 102 may reach at the MFD for releasing the scan job (or print job). Then at step 714, a separate document including the referred content information is created. In some embodiments, the reference processor 206 creates the separate document. At the step 716, the separate document including the referred content information is embedded at the end of a scan output. At step 718, the reference processor 206 generates a final scanned document including the content of the separate document.

Figure 8A:
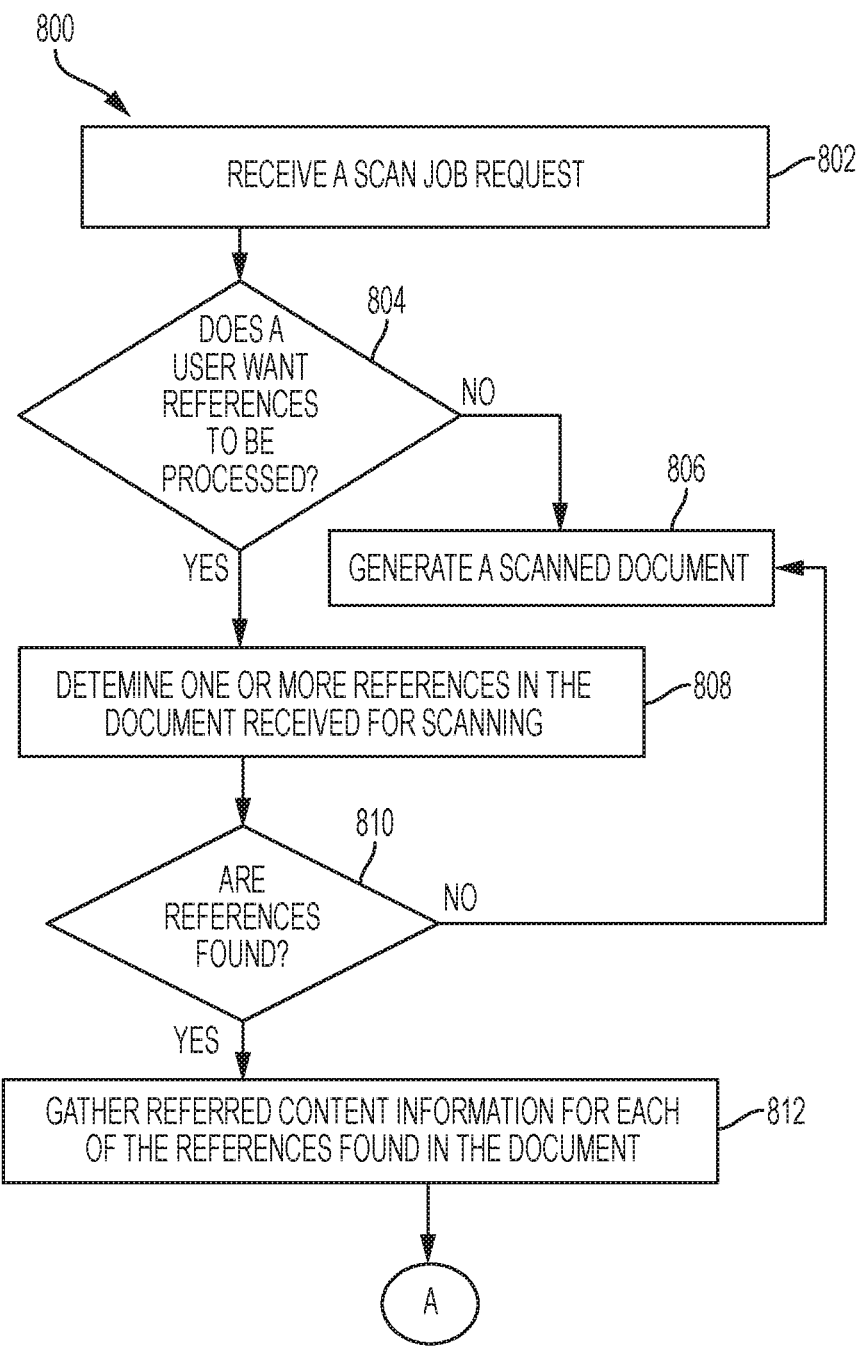
FIGS. 8A-8B represent a flowchart illustrating another exemplary method for processing a number of references mentioned in a document, in accordance with another embodiment of the present disclosure.
Figure 8B:
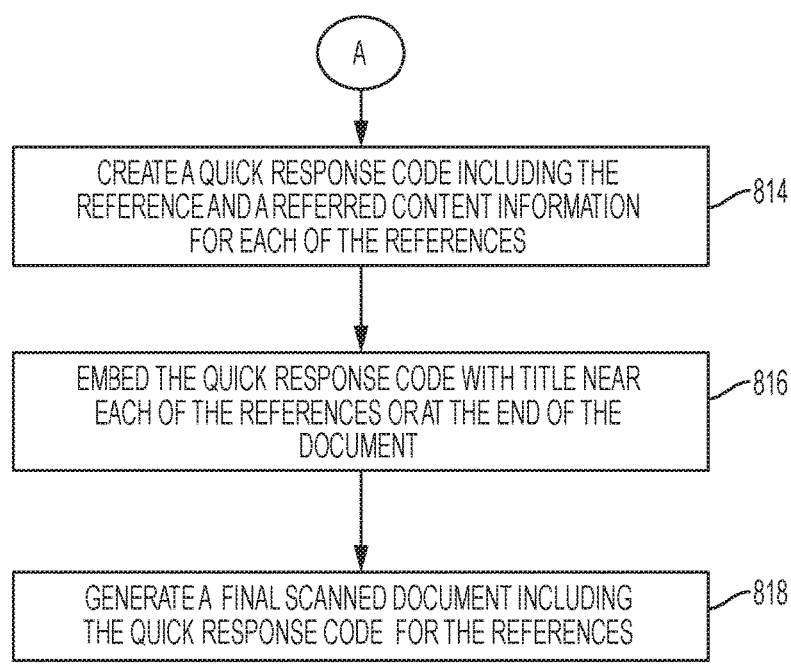

FIGS. 8A-8B represent a flowchart illustrating another exemplary method 800 for processing a number of references mentioned in a document, in accordance with another embodiment of the present disclosure.

At step 802, the MFD 202 receives a scan job request for scanning a document from the user 102. The MFD 202 may prompt the user 102 to select a reference processing option, when the user 102 wants the MFD 202 to process a number of references of the document. At step 804, the MFD 202 checks whether the user 102 wants the references mentioned in the document to be processed. If yes at step 804, then a step 808 is executed else a step 806 is executed. At step 806, the MFD 202 generates a scanned document.

At step 808, the reference processor 206 determines one or more references mentioned in the document. The references may be processed one by one by the reference processor 206. At step 810, the reference processor 206 checks whether any reference(s) found in the document. If yes then step 812 is executed else the control goes back to the step 806. At step 812, the reference processor 206 gathers the referred content information for each of the determined references. Examples of the referred content information may include, but are not limited to, abstract information, publication details, cost of the referred content, author-information, related content, etc.

Then at step 814, the reference processor 206 creates a Quick Response (QR) code corresponding to the referred content information for each of the one or more references mentioned in the document. The QR code may further include the referred content information and/or the references. At step 816, the QR code and a title for each of the one or more references are embedded near the one or more references or at the end of a document. Thereafter, at step 818, the MFD 202 generates a final scanned document including the QR codes.

Figure 9:
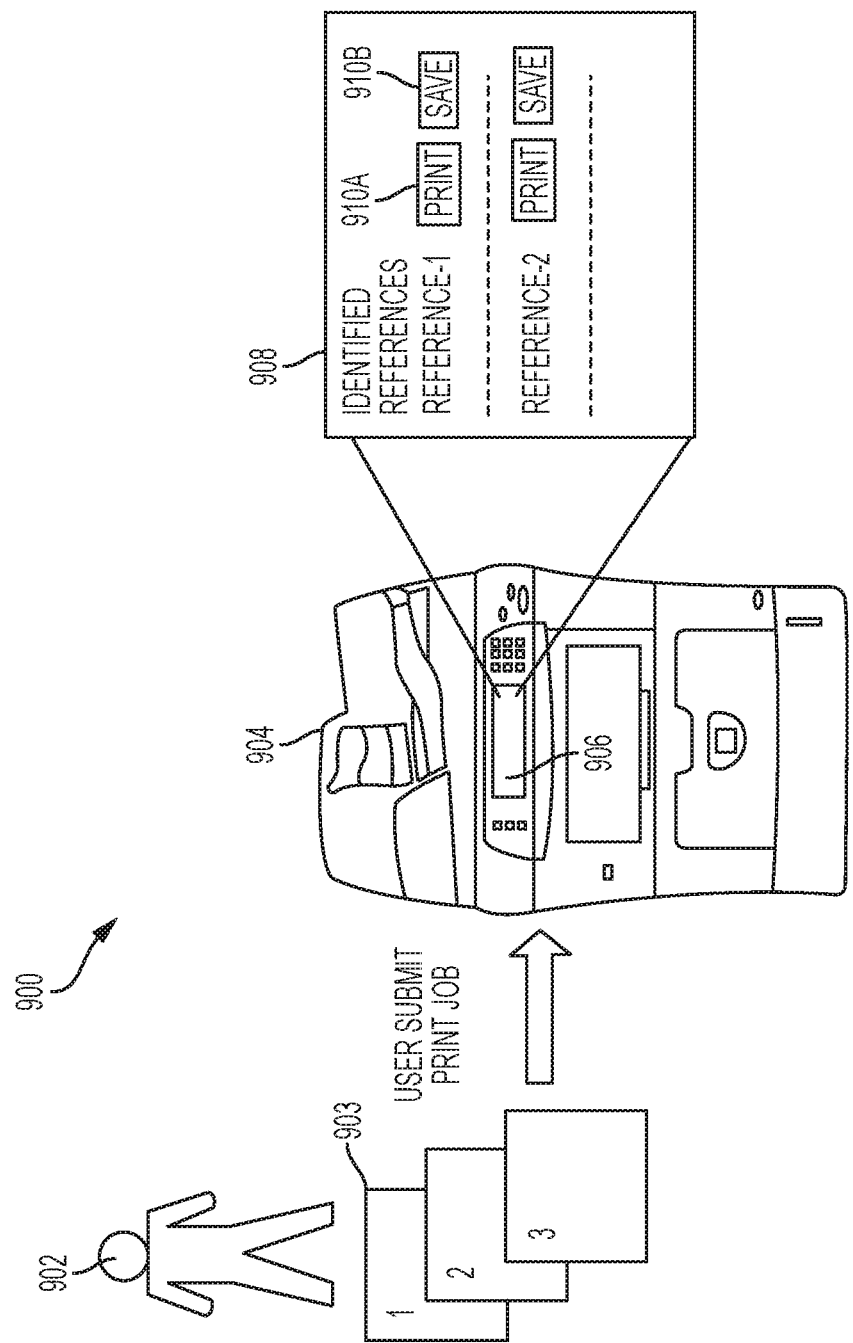
FIG. 9 illustrates a use case implementing the method of FIGS. 4A-4C, in accordance with an embodiment of the present disclosure.

FIG. 9 illustrates a use case 900 implementing the method 400 of FIGS. 4A-4B, in accordance with an embodiment of the present disclosure. As shown, a user 902 submits a print job including a document 903. The document 903 have multiple pages such as three pages. The user 902 submits the print job at a multi-function device (MFD) 904 via a user interface 906 of the MFD 904. The MFD 202 processes the document to find one or more references. The MFD 202 gathers the referred content information such as a source of the one or more references. Examples of the referred content information may include, but are not limited to, abstract information, publication details, cost of the referred content, author-information, related content, etc. The user 902 may reach at the MFD 202 for releasing the print job. The MFD 202 may present an output 908 including the referred content information along with one or more options to the user 902 via the user interface 906. The one or more options may include such as, but are not limited to, a print option 910A, a save option 910B, and a send option (not shown). The user 902 may select one of these options. For example, the user 902 may select the print option 908A for printing the referred content and/or the referred content information.

Figure 10:
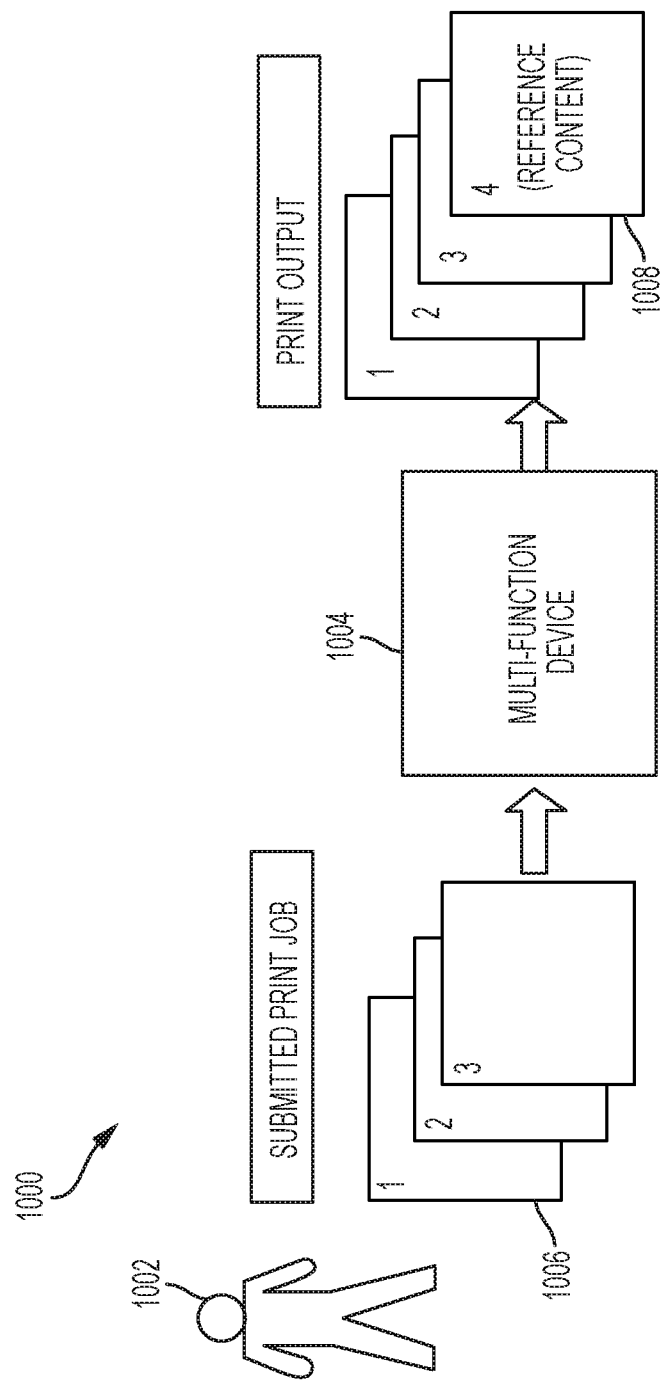
FIG. 10 illustrates another use case for implementing the method of FIGS. 5A-5B, in accordance with another embodiment of the present disclosure.

FIG. 10 illustrates another use case 1000 for implementing the method 500 of FIGS. 5A-5B, in accordance with another embodiment of the present disclosure. A user 1002 submits a print job including a document 1006 of multiple pages for printing at a MFD 1004. The MFD 1004 processes the document 1006 to gather a source of all references mentioned in the document. The user 1002 reaches the MFD 1004 for releasing the print job. The MFD 1004 prints the submitted document and the necessary referred content information about the references mentioned in the document at the end of the document to generate a printed document 1008. Examples of the referred content information may include, but are not limited to, abstract information, publication details, cost of the referred content, author-information, related content, etc. As shown, the printed document includes the necessary referred content information printed on the last page of the document. The user 1002 may download or purchase a referred content based on the referred content information.

Figure 11:
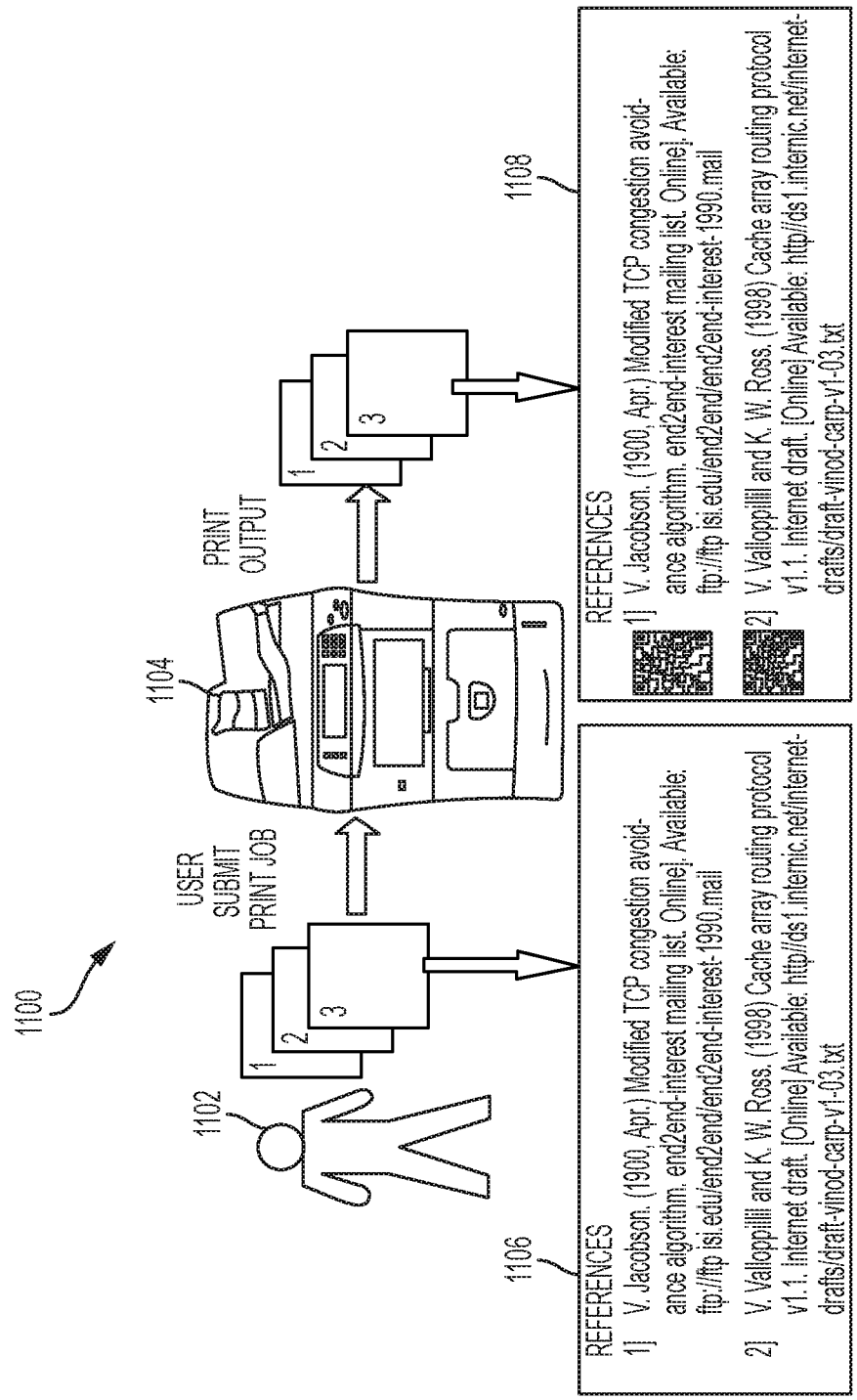
FIG. 11 illustrates a further use case for implementing the method of FIGS. 6A-6B, in accordance with another embodiment of the present disclosure.

FIG. 11 illustrates a further use case 1100 for implementing the method 600 of FIGS. 6A-6B, in accordance with another embodiment of the present disclosure. As shown, a user 1102 chooses a document 1106 for printing via a user interface of an MFD 1104. A reference page of the document 1106 before processing is shown. The MFD 1104 processes the document 1106 to gather a source of all mentioned references. The user 1102 reaches at the MFD 1104 for releasing the print job for printing the document 1106. The MFD prints the document 1106 with a QR code with the necessary referred content information about the references near each of the references to generate a printed document 1108. Examples of the referred content information may include, but are not limited to, abstract information, publication details, cost of the referred content, author-information, related content, etc. The QR code may be processed or scanned later by a reader such as the user 1102, using any digital device, for example a mobile phone, a handheld scanner, and so forth, to retrieve information about the references.

Figure 12:
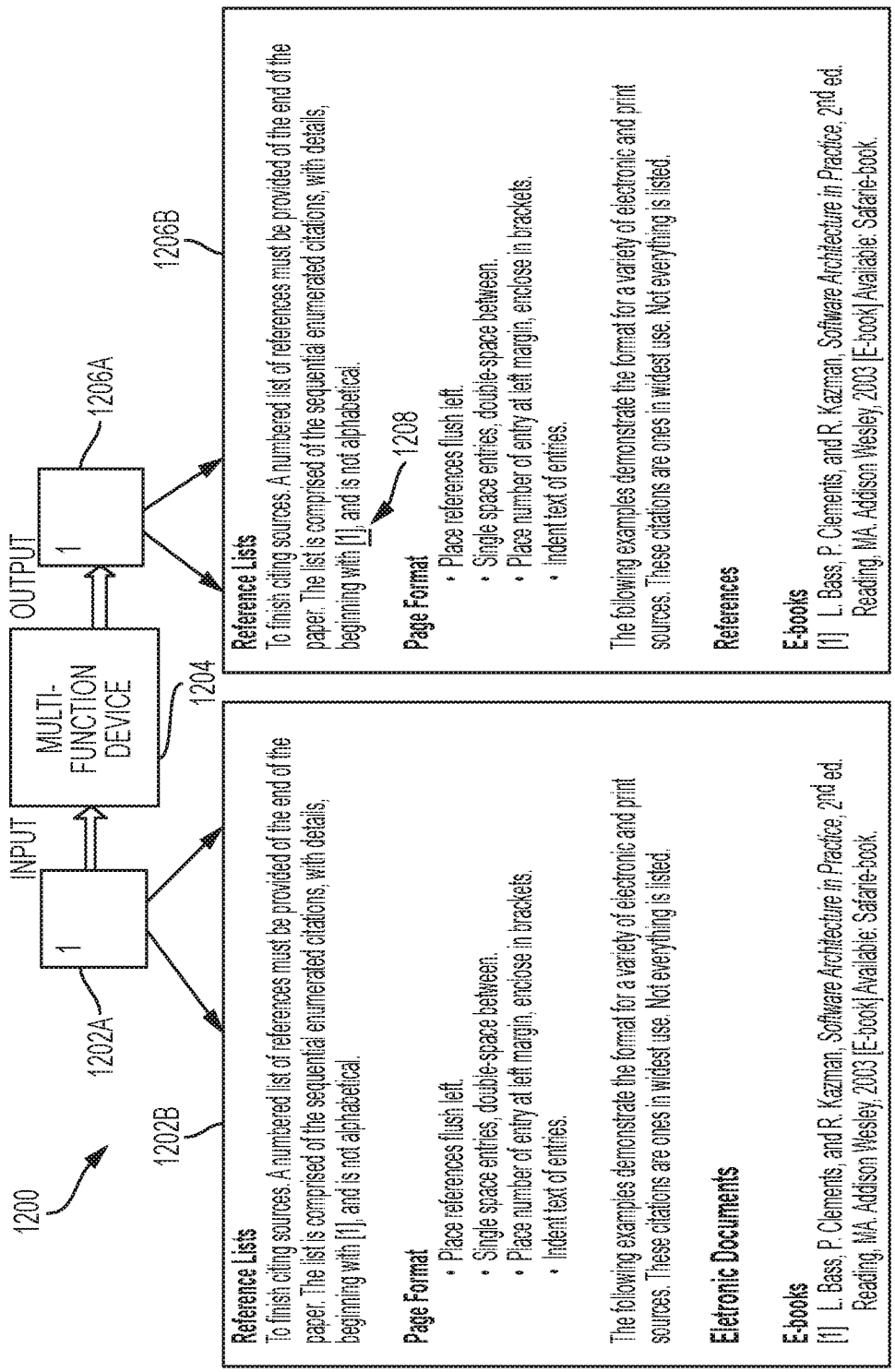
FIG. 12 illustrates a yet another use case for implementing the method of FIGS. 7A-7B, in accordance with a yet another embodiment of the present disclosure.

FIG. 12 illustrates a yet another use case 1200 for implementing the method 700 of FIGS. 7A-7B, in accordance with a yet another embodiment of the present disclosure. As shown, a document 1202A is processed by an MFD 1204 to produce a processed digital document 1206A. A document 1202B is a zoomed view of the document 1202A. Similarly, a processed digital document 1206B is a zoomed view of the processed digital document 1206A.

The MFD 1204 creates the processed digital document 1202 with necessary referred content information about the references at the end of the original input document 1202A. Examples of the referred content information may include, but are not limited to, abstract information, publication details, cost of the referred content, author-information, related content, etc. Further, the MFD 1204 embeds hyperlink information 1208 of the reference details page at an end of each of the references, so that a user may browse the reference details page from the reference list section present in the processed digital document 1206B.

Figure 13:
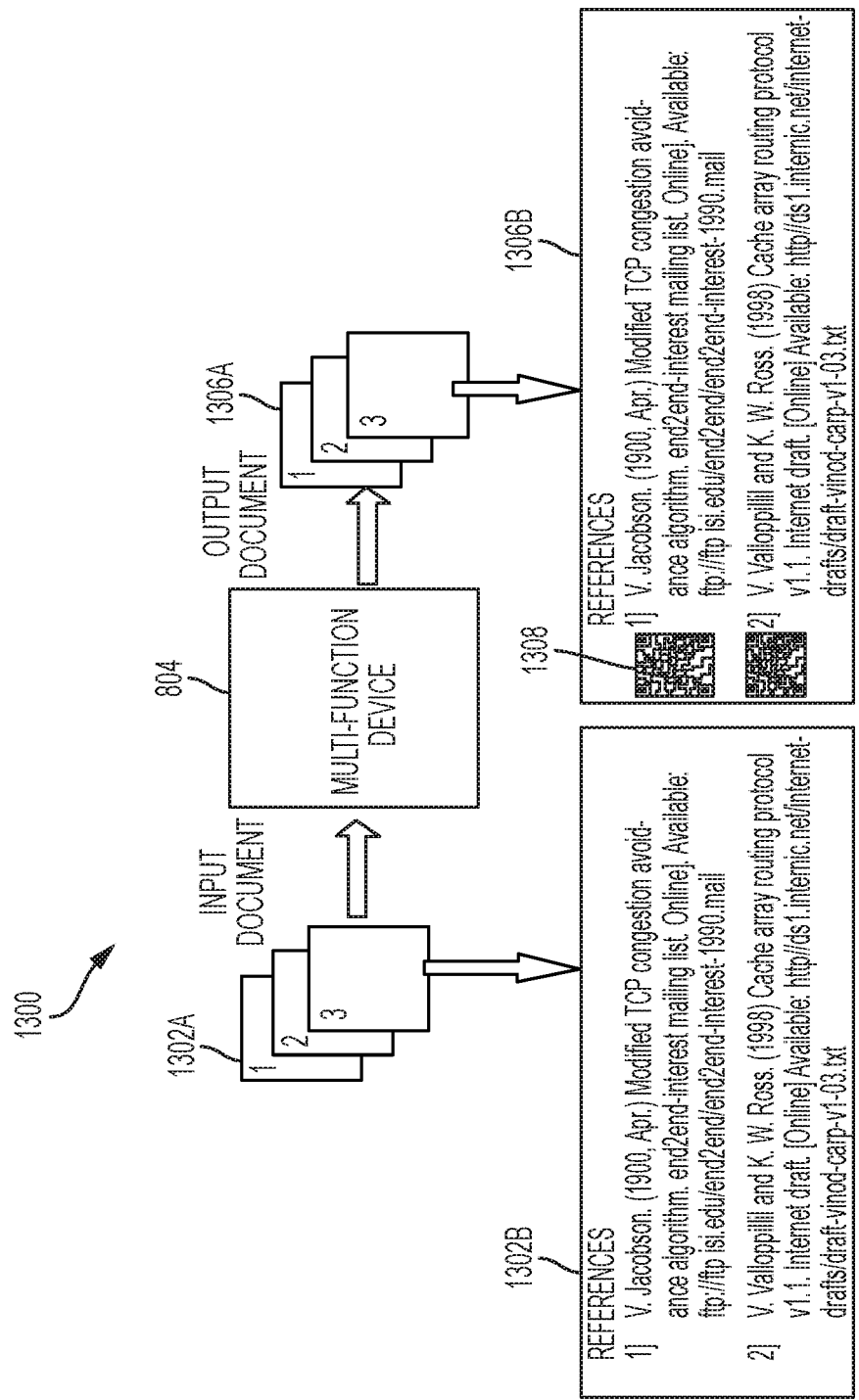
FIG. 13 is a use case for implementing the method of FIGS. 8A-8B, in accordance with an embodiment of the present disclosure.

FIG. 13 is a use case 1300 for implementing the method 800 of FIGS. 8A-8B, in accordance with an embodiment of the present disclosure. An MFD 1304 can process an input document 1302A to gather a source of all mentioned references. The MFD 1304 can generate a QR code 1308 for each of the references mentioned in the document 1302A. The MFD 1304 may further create a processed digital document 1306A with the QR code 1308 with the necessary referred content information about the references near each of the references. An input document 1302B is a zoomed view of the input document t1302A. A processed digital document 1306B is a zoomed view of the document 1306A including the QR code 1308.

The disclosed system processes documents to find one or more references and identify a source of the individual references. Upon identifying the source of references, the system presents useful referred content information like abstract information, publication details, cost of the referred content, author-information, related content, etc. to the user.

The disclosed system allows a user to save time for reference processing. Based on the reference content information presented to the user, the user may purchase the referred content and/or take a print out for further reading. The user may decide early on buying the referred content and hence can save time.

The disclosed systems may be implemented in libraries, editorial field, research field, offices, and so forth.

The disclosed system may present the information to the user in multiple ways. The referred content information may be printed as additional last sheets as part of a job request such as the print job. In alternative embodiments, the referred content information may be shown to the user via the user interface of the MFD, so that the user can decide while releasing the particular print job. In some embodiments, the referred content information may be printed as a QR code adjacent to the corresponding reference, which the user can later process using any of the suitable digital device like a mobile phone.

The disclosed systems can also be expanded to process existing digital documents (i.e., pre-stored digital documents) to generate another digital document including referred content information corresponding to references mentioned in the digital documents.

The disclosed methods and systems can be applied to the existing digital documents to create a new digital document with the reference processed.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "receiving," or "displaying," or "storing," or "changing," "or sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing a plurality of references included in a document, the method comprising:
   receiving a job request including a document for processing from a user, wherein the document comprises at least one of: a hardcopy document and a digital document, wherein the document comprises one or more references;
   prompting the user to select a reference processing option when the user wants at least one reference of the document to be processed;
   based on the selection of the reference processing option, determining the one or more references included in the document;
   based on the determined one or more references, searching for a referred content information corresponding to each of the one or more references; and
   presenting the referred content information along with one or more options including at least one of: a print option, a save option and a send option to the user.

2. The method of claim 1, wherein the referred content information along with one or more options including at least one of a print option, a save option and a send option are presented via a user interface of a multi-function device, wherein the referred content information further comprises a purchase information for purchasing the referred content and a download information for downloading the referred content.

3. The method of claim 2 further comprising receiving a selection of at least one of the print option, the send option, and the save option from the user.

4. The method of claim 3 further comprising printing the referred content information on a last page of the document when the user selects the print option.

5. The method of claim 3 further comprising saving the referred content information at a multi-function device when the user selects the save option.

6. The method of claim 3 further comprising sending the referred content information to at least one computing device via a network when the user selects the send option.

7. The method of claim 1 further comprising creating a new document by embedding the referred content information within the document, wherein the user retrieves the references based on the embedded referred content information.

8. The method of claim 7 further comprising embedding a Quick Response (QR) code corresponding to the referred content information of each of the one or more references in the new document, wherein the user retrieves the referred content information of each of the one or more references by scanning the embedded Quick Response (QR) code.

9. A system for processing a plurality of references included in a document, the system comprising:
   a multi-function device configured to receive a job request including a document for processing from a user, the document comprises at least one of a hardcopy document and a digital document, wherein the document comprises one or more references, wherein the multi-function device further comprising:
   a reference processor configured for:
   prompting the user to select a reference processing option when the user wants at least one reference of the document to be processed;
   determining the one or more references included in the document based on the selection of the reference processing option; and
   search for a referred content information corresponding to each of the one or more references based on the determined one or more references;
   wherein the referred content information along with one or more options including at least one of a print option, a save option and a send option are presented to the user via a user interface of the multi-function device.

10. The system of claim 9, wherein the referred content information comprises a purchase information for purchasing a referred content and a download information for downloading the referred content.

11. The system of claim 10, wherein the user interface is configured for receiving a selection of at least one of the print option, the send option, and the save option from the user.

12. The system of claim 11, wherein the multi-function device is further configured for printing the referred content information on a last page of the document when the user selects the print option.

13. The system of claim 11, wherein the reference processor is further configured for saving the referred content information at the multi-function device when the user selects the save option.

14. The system of claim 11, wherein the multi-function device is further configured for sending the referred content information to at least one computing device via a network when the user selects the send option.

15. The system of claim 9, wherein the reference processor is further configured for creating a new document by embedding the referred content information within the document, wherein the user retrieves the references based on the embedded referred content information.

16. The system of claim 15, wherein the reference processor is further configured for embedding a Quick Response (QR) code corresponding to the referred content information of each of the one or more references in the new document, wherein the user retrieves the referred content information of each of the one or more references by scanning the embedded Quick Response (QR) code.

17. A computer program product embodied on a non-transitory computer readable medium having instructions for processing a plurality of references mentioned in a document, the computer program product performing the following steps:
   receiving a job request including a document for processing from a user, wherein the document comprises at least one of a hardcopy document and a digital document;
   prompting a user to select a reference processing option when the user wants at least one reference of the document to be processed;

based on the selection of the reference processing option, determining one or more references mentioned in the document;

searching for a referred content information corresponding to each of the one or more references based on the determined one or more references; and presenting the referred content information along with one or more options including at least one of a print option, a save option and a send option to the user.

18. The computer program product of claim 17 further comprising instructions for presenting the referred content information along with one or more options including at least one of a print option, a save option and a send option via a user interface of the multi-function device, wherein the referred content information comprises a purchase information for purchasing a referred content and a download information for downloading the referred content.

19. The computer program product of claim 18 further comprising instructions for receiving a selection of at least one of the print option, the send option, and the save option from the user, wherein computer program product further comprises instructions for:

printing the referred content information on a last page of the document when the user selects the print option;

saving the referred content information in the multi-function device when the user selects the save option; and sending the referred content information to a computing device via a network when the user selects the send option.

20. The computer program product of claim 17 further comprising instructions for:

creating a new document by embedding the referred content information within the document, wherein the user retrieves the references based on the embedded referred content information; and embedding a Quick Response (QR) code corresponding to the referred content information of each of the one or more references in the new document, wherein the user retrieves the referred content information of each of the one or more references by scanning the embedded Quick Response (QR) code.

\* \* \* \* \*